April 21, 1953 F. J. LAHER 2,635,870
VEHICLE SPRING
Filed Oct. 14, 1949
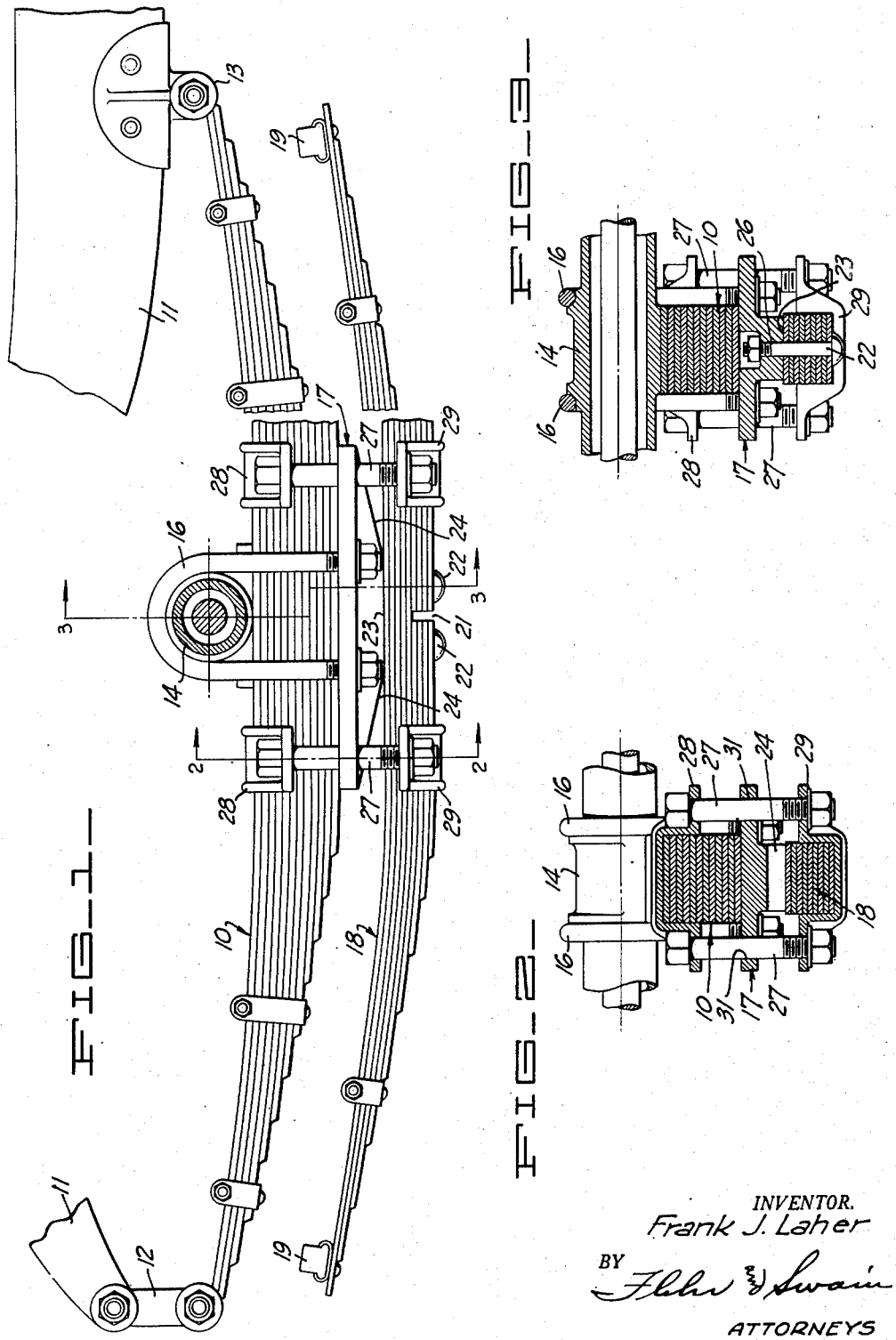
INVENTOR.
Frank J. Laher
BY
ATTORNEYS Patented Apr. 21, 1953

2,635,870

UNITED STATES PATENT OFFICE 2,635,870

VEHICLE SPRING

Frank J. Laher, Orinda, Calif., assignor to Laher Spring & Tire Corporation, Oakland, Calif., a corporation of California Application October 14, 1949, Serial No. 121,341

1 Claim. (Cl. 267—45)

This invention relates generally to the construction of vehicle springs, and particularly to so-called helper or overload springs which enable a vehicle having more or less conventional leaf springs, to carry heavier loads than ordinarily intended.

In Patent No. 2,188,689 there is disclosed a helper or overload spring construction which is applicable to the conventional leaf springs of a motor vehicle or trailer to enable the springs to carry a heavier load. In conjunction with the mounting of such overload springs, means is employed whereby they can be adjusted to suit particular overload conditions. The particular embodiments disclosed in said Patent 2,188,689 are particularly adapted for use with the lighter types of motor vehicles and trailers, where both the normal and the overload conditions are not severe.

It is a general object of the present invention to provide an improved overload spring construction incorporating the invention of said Patent 2,188,689, but with improved features which adapt the construction for heavy duty service, as for example use on motor buses and heavy trucks.

Additionol objects and features of the present invention will appear from the following description in which the preferred embodiment of the invention has been set forth in detail in conjunction with the accompanying drawing.

Referring to the drawing:

Figure 1 is a side elevational view illustrating a spring construction incorporating the present invention.

Figure 2 is a cross-sectional detail taken along the line 2—2 of Figure 1.

Figure 3 is a cross-sectional detail taken along the line 3—3 of Figure 1.

Referring to Figure 1 of the drawing I have shown a conventional spring 10 of the half elliptical leaf type. The ends of the spring are attached to the vehicle frame 11 by conventional connections 12 and 13. The medial part of the spring is ordinarily attached to the vehicle axle housing 14 by means of U bolts 16. It is customary practice to employ a clamping plate engaging the underside of the spring, and through which the U bolts 16 extend.

When applying the present invention the conventional clamping plate is replaced by a special plate 17. This plate serves to mount the overload spring 18, which is likewise semi-elliptical in form. The ends of spring 18 are provided with pads 19 formed of resilient rubber or like material, and serving under overload conditions to engage and support the end portions of the main spring 10.

In the improved construction illustrated, a plurality of the smaller leaves constituting the overload spring 18, are severed or parted as indicated at 21, and on opposite sides of the slot so formed, the leaves are firmly clamped together by retaining bolts 22. The clamping plate 17 extends for a substantial distance beyond the sides of the U bolts 16. The lower face of this plate has a substantially flat portion 23, which seats the medial portion of the overload spring 18, and also has the inclined or beveled portions 24, which extend from the portion 23 to the ends of the plate. This construction facilitates adjustment of the overload spring. The medial portion of the clamping plate 17 is provided with openings 26 to accommodate the ends of the retaining bolts 22.

For adjusting the arch applied to the overload spring, I employ two sets of bolts 27. The ends of these bolts engage saddles 28 and 29, which are seated on the main spring 10, and on the overload spring as illustrated. In addition the bolts 27 extend slidably through openings 31 (Figure 2) in the corners of the plate 17.

In practice, after the overload spring 18 has been applied to the main spring in the manner described above, the bolts 27 are tightened to apply a desired amount of arch to the overload spring 18, whereby the pads 19 will assist in supporting the main spring 10 under overload conditions. All of the leaves of the overload spring are held in proper assembled alignment because of the retaining bolts 22, and also because the smaller leaves which are severed are seated within the saddles 29 as illustrated in Figure 2. Likewise the overload spring is retained in proper aligned position beneath the main spring because of the interlocking relation between the bolts 27 and the clamping plate 17. The forces exerted by the bolts 27 are applied through the saddles 28 and 29 directly to the main and overload springs. Thus such forces are not applied to the clamping plate 17, and this plate simply performs the function of forming a seating surface for the overload spring, and for clamping the main spring to the axle 14. Tightening or loosening of the nuts of bolts 27 serves to adjust the spring to different overload conditions, by adjusting the arch of the overload spring. For a given static vehicle load a change in the arch of spring 18 varies the distance between the pads 19 and the ends of the main spring 10.

It will be evident that the construction described above is particularly well adapted for heavy duty service, as for example on buses and heavy trucks. The parts can be designed to have the strength required for such services, while at the same time facilitating adjustments which may be required from time to time.

I claim:

In vehicle spring equipment of the character described for application to a vehicle spring of the half elliptical leaf type, where the vehicle spring has its ends attached to the frame of the vehicle and has its medial portion attached to an axle of the vehicle by means of bolts, a clamping plate engaged by said bolts and serving to retain the vehicle spring upon said axle, one face of the plate engaging one side of the vehicle spring, an overload spring of the half elliptical leaf type, said overload spring having one side of the same engaging the other side of the clamping plate, a plurality of the shorter leaves of said overload spring intermediate the ends of the same being parted, retaining bolts extending through all the leaves of the overload spring adjacent to and on opposite sides of said part, said retaining bolts being attached to said clamping plate, and additional means including portions engaging the upper surface of said vehicle spring and the lower surface of said overload spring on opposite sides of said axle for applying clamping forces directly between outer opposed faces of said springs for adjusting the arch of the overload spring to thereby adjust the normal position of the ends of the overload spring relative to the vehicle spring, and including clamping bolts, said bolts loosely extending through apertures in the end corners of the clamping plate and engaging said portions to draw said portions together.

FRANK J. LAHER.

References Cited in the file of this patent
UNITED STATES PATENTS

| Number | Name | Date |
|---|---|---|
| 1,747,726 | Monteith | Feb. 18, 1930 |
| 2,188,689 | Marco | Jan. 30, 1940 |